United States Patent [19]

Reuber et al.

[11] Patent Number: 4,921,298
[45] Date of Patent: May 1, 1990

[54] LIFT-UP SUN ROOF, IN PARTICULAR FOR AUTOMOTIVE VEHICLES

[75] Inventors: Gerhard Reuber, Drolshagen; Achim Braun, Nuembrecht; Udo Hesseler, Drolshagen, all of Fed. Rep. of Germany

[73] Assignee: Alfred Teves GmbH, Frankfurt am Main, Fed. Rep. of Germany

[21] Appl. No.: 322,755

[22] Filed: Mar. 13, 1989

[30] Foreign Application Priority Data

Mar. 26, 1988 [DE] Fed. Rep. of Germany ....... 3810443

[51] Int. Cl.⁵ ................................................ B60J 7/05
[52] U.S. Cl. ...................................... 296/221; 296/223
[58] Field of Search ........................ 296/216, 221, 223

[56] References Cited

FOREIGN PATENT DOCUMENTS

| | | |
|---|---|---|
| 3504570 | 8/1986 | Fed. Rep. of Germany ...... 296/216 |
| 3532104 | 4/1987 | Fed. Rep. of Germany . |
| 42539 | 9/1937 | Netherlands ........................ 296/221 |
| 940318 | 10/1963 | United Kingdom ................ 296/216 |

*Primary Examiner*—Dennis H. Pedder
*Attorney, Agent, or Firm*—Robert P. Seitter

[57] ABSTRACT

A lift-up sun roof, in particular for automotive vehicles, featuring a simple design and a low overall height is proposed, with a rigid cover (2) which in its closed position closes a roof opening in a roof area (1) and which is guided at lateral guide rails (5, 6) by means of siding elements (4) and is raisable with one end above the stationary roof area (1) or, at option, slidable below the said roof area (1) upon lowering of one end. In this configuration, the connection between said cover (2) and said sliding element (4) is envisaged to be effected through a lever (7, 15, 16) which is pivotable about the longitudinal axis of said guide rail (5, 6), the angle of pivoting being determined by a control ramp (9).

6 Claims, 4 Drawing Sheets

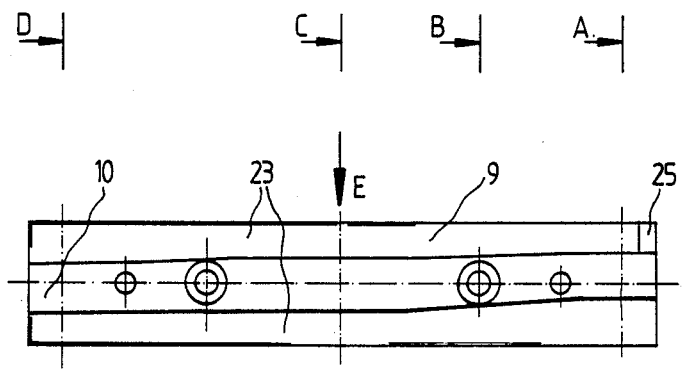
FIG.4
FIG.5
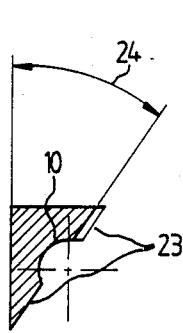 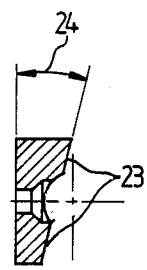 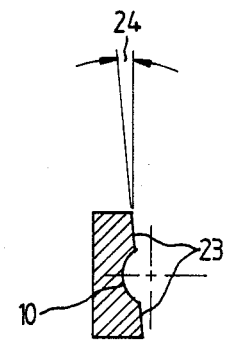 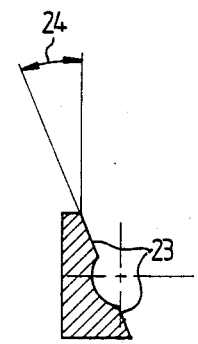
FIG.6   FIG.7   FIG.8   FIG.9

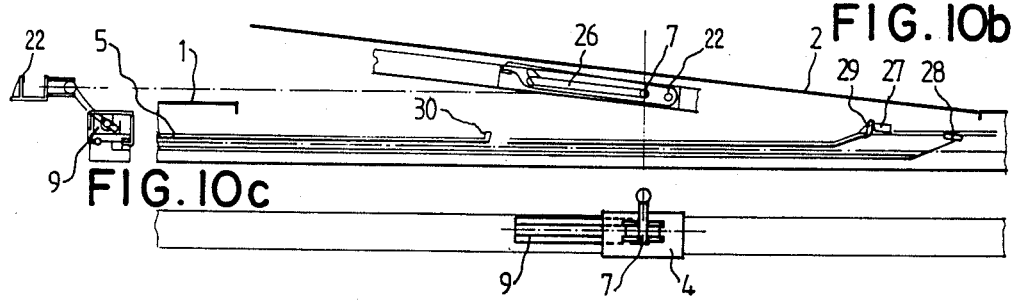
FIG. 10b / FIG. 10c / FIG. 10a
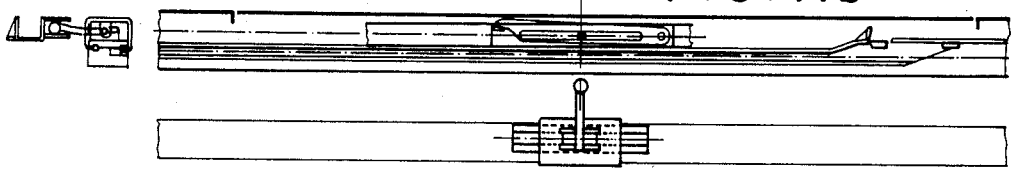
FIG. 11c / FIG. 11b / FIG. 11a
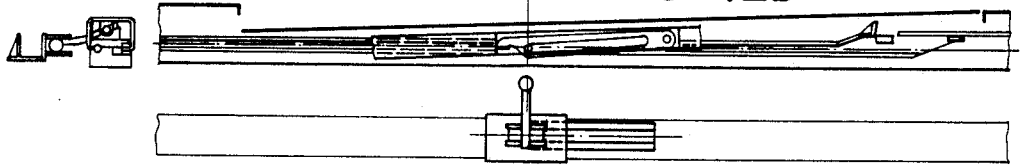
FIG. 12c / FIG. 12b / FIG. 12a
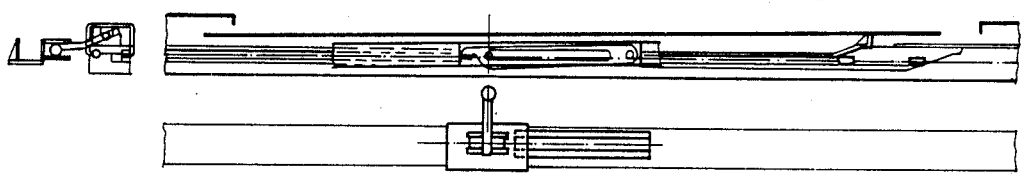
FIG. 13c / FIG. 13b / FIG. 13a
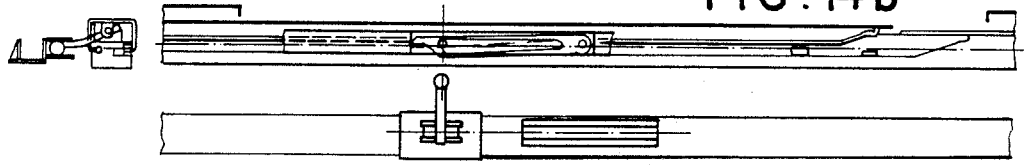
FIG. 14c / FIG. 14b / FIG. 14a

LIFT-UP SUN ROOF, IN PARTICULAR FOR AUTOMOTIVE VEHICLES

BACKGROUND OF THE INVENTION

The present invention relates to a lift-up sun roof for automotive vehicles. The sun roof includes a rigid cover which in its closed position closes a roof opening in a roof area. The cover is guided at lateral guide rails by means of sliding elements and is raisable with one end above the stationary roof area or, optionally, is slidable below the roof area upon lowering of one end.

A lift-up sun roof of this general nature is known from German patent application published without examination, No. 35 32 104, in which the lifting of the cover is effected by raising members which are pivotable about the transverse axis of the guide rails. The raising members are actuated by means of an expensive control link and link studs guided therein. Besides the expensive mechanism, this lift-up sun roof has the disadvantage of a large overall height.

SUMMARY OF THE INVENTION

It is, therefore, an object of the present invention to provide a lift-up sun roof which can be manufactured easily and at low cost and which is distinguished by a low overall height. According to the invention, this object is achieved by providing a connection between the cover and the sliding element. This connectoion is made by a lever which is pivotable about the longitudinal axis of the guide rail, the angle of pivot being determined by a control ramp.

In one embodiment of the invention, the control ramp presents a surface facing the lever whose angle of gradient in transverse direction with respect to the sliding direction of the cover varies along the sliding direction. This construction can be achieved in a particularly simple way since the control ramp has a cross-sectional area varying along the sliding direction of the cover and determines the angle of gradient of the plane facing the lever. In this context, it is of particular advantage for the control ramp to be integrated in the guide rails.

An integrated ramp having an angle of gradient in transverse direction relative to the sliding direction is formed by a component of helical configuration, preferably by the guide rail itself. In manufacture, this construction can be achieved by a partial twisting of a bar.

In another advantageous embodiment of the invention, the fulcrum of the pivotable lever is guided so that the lever is subject to the action of the control ramp on either side of its fulcrum. This enables the control ramp to assume the pivoting function as well as the guiding function with respect to the lever. In addition, this forced control enables elimination of a pre-tensioning device.

A particularly simple construction for supporting the lever is achieved by forming the end of the lever distant from the fulcrum in a spherical configuration and supporting this end in a guide slidable, at least in transverse direction with respect to the sliding direction of the cover. Another construction for balancing the length of the lever while the cover performs its lifting movement is to form the lever of two parts which are linked in such a manner as to be axially slidable into each other.

BRIEF DESCRIPTION OF THE DRAWING

The method of functioning and further advantageous features of the invention will be revealed by the following description of the inventive lift-up sun roof, with reference to the accompanying drawing. In the drawing:

FIG. 4 shows a top view of a preferred embodiment of the control ramp;

FIG. 5 shows a lateral view of the control ramp according to FIG. 4;

FIG. 6 to FIG. 9 show a cross section of the control ramp according to FIG. 4 rotated 90 degrees with respect thereto;

FIG. 10a to FIG. 14c show illustrations of different positions of the lift-up sun roof.

DETAILED DESCRIPTION OF THE INVENTION

Figure 1:
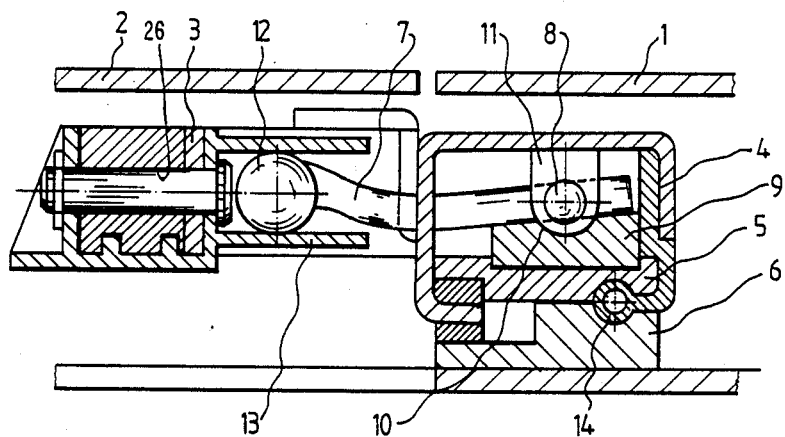
FIG. 1 shows a section through a first embodiment of the invention.

In the Figures, identical components are given identical reference numerals.

FIG. 1 shows a detail of the roof area 1 in whose opening a cover 2 mounted on a frame 3 is accommodated. The lift-up sun roof is actuated by sliding the two-part sliding element in the form of a frame 4 which is axially slidably supported in the guide rails 5, 6. In the sliding element or frame 4, the lever 7 is secured by means of a pin 8 so as to allow its pivoting about the longitudinal axis of said guide rails, in which configuration the lever rests on the control ramp 9 on either side of said pin 8. Said control ramp 9 which will still be described in more detail with reference to FIGS. 4 to 9 is formed with a longitudinal groove 10 which extends in the sliding direction and in which the suspension section 11 of said sliding element 4 is guided.

The angle the supporting surface of the lever 7 at the control ramp has transversely with respect to the sliding direction varies along the sliding direction and determines the vertical movement of the frame 3, respectively of the cover 2.

The end of the lever disposed distant from the fulcrum is configured as a ball 12 and supported in a guide 13 being connected to said frame 3 in such a manner as to allow said ball 12 to slide in the sliding direction of the sliding element 4 as well as transversely to that direction.

The sliding element 4 is furnished with a hollow cylinder-shaped section 14 which is guided between said guide rails 5, 6 and which serves to accommodate a transmitting element for the driving force. Said transmitting element may, for example, be constituted by a rope, by rods or by a spindle, the inner surface of said hollow cylinder-shaped section 14 being configurated as a thread in the latter case. Obviously, a lever system of the kind described above is provided on the left side of the lift-up sun roof as well as specularly on the right side, each of which being supported on guide rails.

Figure 2:
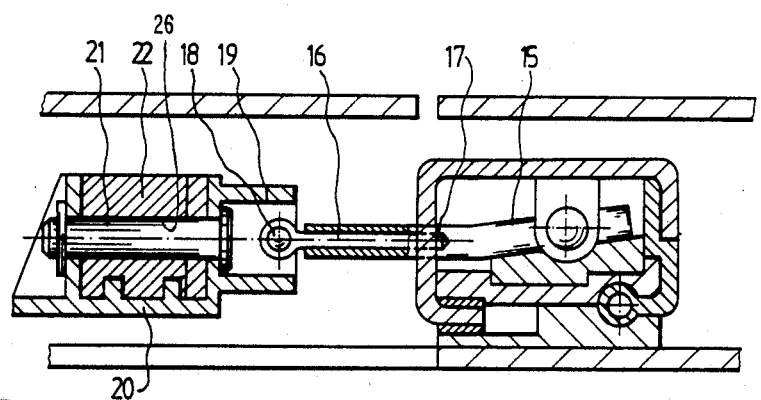
FIG. 2 shows a section through a second embodiment of the invention.

FIG. 2 shows a lever arrangement in which the balancing movement in the event of a vertical slide of the roof does not take place between the guide and the lever but the lever is configurated two-part in this case. In this context, the first lever part 15 is pivotably secured by means of a pin to the sliding element the same way as shown in FIG. 1, while the second lever part 16 which is slidably guided in said first lever part 15 within the latter's central bore 17, is fastened by the pin 18 to the receiving part 19. Said receiving part 19 represents a section of the slide block 20 being retained at the frame 22 in a way allowing its movement in the sliding direction. Retaining of said slide block 20 is effected by means of a pin 21 which passes through a slotted hole 26 in the frame 22.

Figure 3:
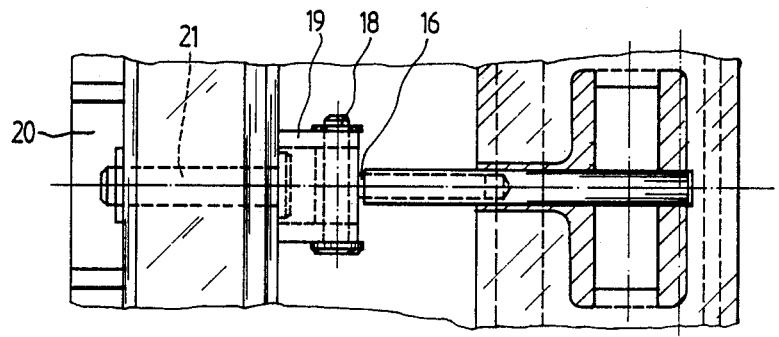
FIG. 3 shows a top view of the embodiment according to FIG. 2.

FIG. 3 shows a top view of the forementioned embodiment in which identical reference numerals are used as in FIG. 2.

FIG. 4 shows the top view of the control ramp 9 as is shown in cross section in FIGS. 1 and 2 and which is boiled or screwed to the guide rails 5, 6 in such a manner that its longitudinal axis extends parallel to the sliding direction. Control ramp 9 has a cross-sectional area which varies along the longitudinal axis of the cover 2. Said control ramp 9 is furnished with a longitudinal groove 10 having a U-shaped cross section in which the suspension section 11 of the sliding element 4 is guided and presents through bores being directed vertically with respect to the said longitudinal groove and serving for the fixation to the guide rails by means of bolts, screws or pins.

As is revealed by FIGS. 5 to 9, the surface 23 of said control ramp 9 acting on the lever 7, respectively 15 forms an angle of gradient 24 as measured transversely with respect to the sliding direction, said angle of gradient varying over the length of the control ramp. In this connection, FIG. 5 shows a lateral view of the control ramp 9 in accordance with the direction E in FIG. 4. FIG. 6 shows a section A—A, FIG. 7 a section B—B, FIG. 8 a section C—C, and FIG. 9 a section D—D, each of them in accordance with FIG. 4.

At the end of the control ramp 9 which—incorporated in the automotive vehicle—points into the driving direction, there is a stop 25 against which the lever 7, respectively 15 is pushed, by means of the sliding element 4, further in the closing direction beyond the closed position of the cover 2. In this manner, the lever 7, respectively 15 projects on the side of the control ramp 9 on which the stop 25 is arranged.

When the lift-up sun roof is in the closed condition, then the lever 7, respectively 15 is abutted with the control ramp 9 along the line C—C. When it is pushed beyond this position further in the closing direction against the stop 25, then the increase of the angle 24 during transition from the position according to section C—C to that according to section A—A will cause a lifting movement of the rear edge of the cover 2. If, however, the lever is moved by means of the sliding element 4 in the opening direction, then the variation of the angle from the position according to section C—C to that according to section D—D will cause the rear cover edge to be lowered, as a result of which the cover will allow to be slid below the roof area.

In FIGS. 10a to 14c, different positions of the cover 2, respectively of the lever arrangement according to FIG. 1 are illustrated. In each of these Figures, a top view of the lever arrangement is shown beneath a view of the longitudinal side, while to the left of these illustrations, the lever position is shown in accordance with a section directed transversely to the sliding direction.

FIG. 10b shows the lift-up sun roof in a position in which the rear end of the cover 2 is raised above the roof area 1. In this position, the sliding element 4 is slid at the maximum extent in the driving direction of the vehicle. The lever 7 is slid in the same manner in its linking groove 26 arranged in the frame 22. On account of the angle of gradient 24 at the control ramp 9 to be measured in transverse direction with respect to the sliding direction, the lever 7 is swung upward. The frame parts 27, 28 take care of locking of the cover 2 in collaboration with a stop 29. Another stop 30 arranged at the guide rail 5 serves to lock the cover 2 in the closed condition.

This condition is illustrated in FIGS. 11a and 11b, with the sliding element or frame 4 assuming a middle position on the control ramp 9. Also the end of the lever 7 distant from the fulcrum is situated in a middle position in the linking groove 26. The angle of gradient 24 of the control ramp 9 (s. FIG. 1 and FIG. 8) pivots the roof 2 into a position in which the rear edge is flush with the roof area 1. In this position, the cover 2 comes to be locked by the frame 4 and the frame parts 27, 28 in interaction with the stops 29, 30.

By a further slide of the sliding element 4 in the opening direction by which the lever 7 comes to be positioned at the rear end of the linking groove 26 which is directed slightly upward, the lift-up sun roof is moved into a position in which the rear edge of the cover 2 is lowered beneath the level of the roof area 1. In this position, the lever 7 is located at the level of the section D—D according to FIG. 4. Due to the lowering, the frame 4 and frame parts 27, 28 do no longer make catch with the stops 29, 30, so that the lift-up sun roof is unlocked. According to FIGS. 13a and 14a, the sliding element 4 is now slid on the guide rails in contrary direction to the driving direction of the vehicle for wider opening of the lift-up sun roof, so that the control ramp 9 does not longer act on the lever 7. As a result, the cover 2 is slid below the roof area 1.

Figure 15:
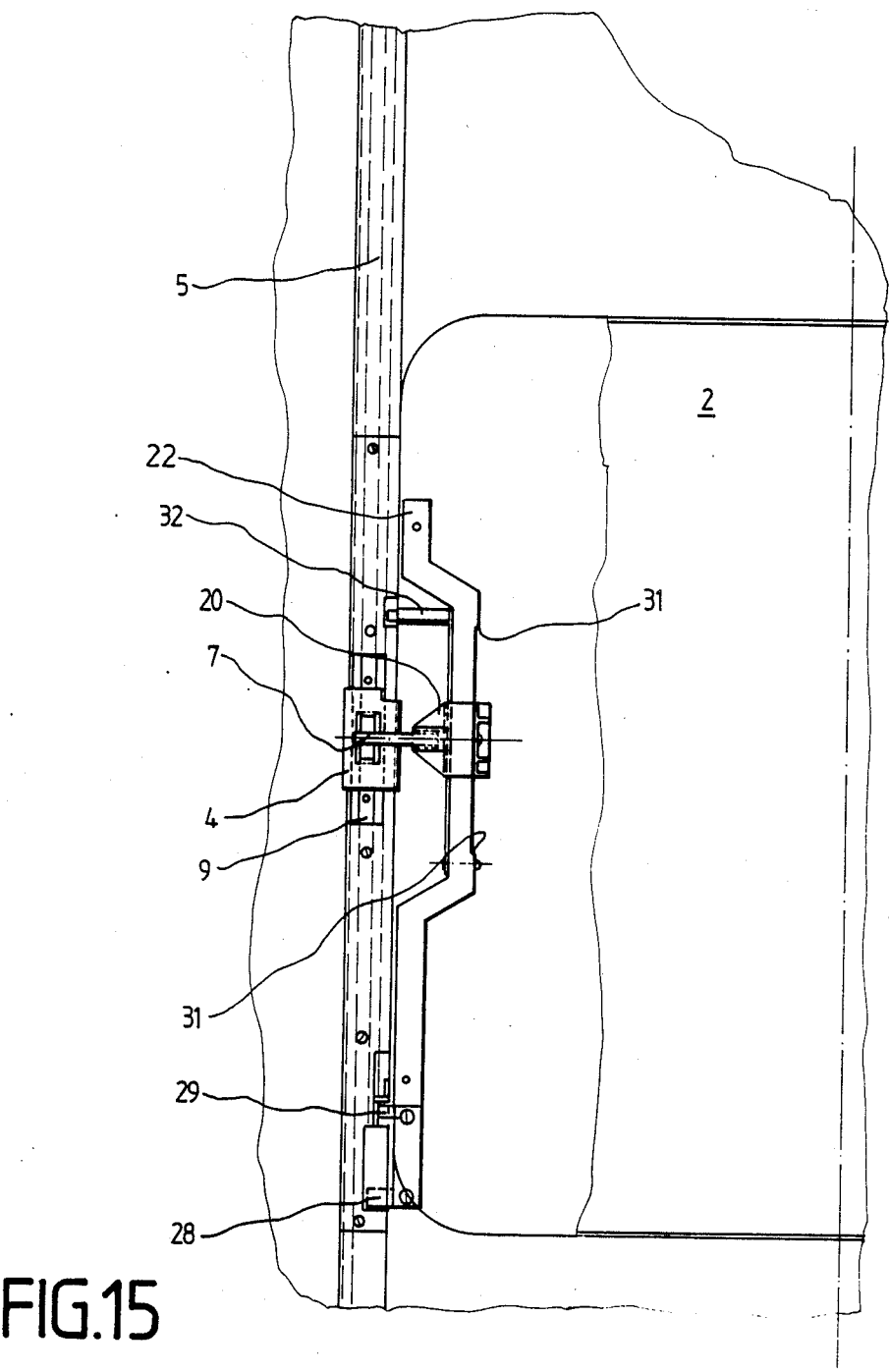
FIG. 15 shows a top view of an inventive lift-up sun roof mounted in an automotive vehicle which is an opposite side view relative to the previous drawing figures.

FIG. 15 shows a top view on one of the two actuating units arranged at the lift-up sun roof. The slide block 20 is slidable on the frame 22 screwed or bolted to the cover 2, its slide being limited by the stops 31. Said slide block is connected through the lever 7 to the sliding element 4 being slidably guided on the guide rail 5, respectively on the control ramp 9. In the illustration, the lift-up sun roof is in the closed position in which the cover 2, respectively the frame 4 is locked to the guide rails 5, 6 by the frame parts 27, 28 and by the locking bar 32 which, too, is screwed or bolted to the frame.

What is claimed is:

1. A lift-up sun roof for automotive vehicles comprising a rigid cover which in its closed position closes a roof opening in a roof area and which is guided at lateral guide rails by means of sliding elements and is raisable with one end above the stationary roof area and which can be slidable below the roof area upon lowering of one end, a connection between the said cover and said sliding element being effected through a lever which is pivotable about a longitudinal axis of the said guide rail, a control ramp supporting said lever wherein an angle of pivoting of said lever is determined by said control ramp.

2. The lift-up sun roof of claim 1 wherein said control ramp presents a surface facing said lever whose angle of gradient transverse to said longitudinal axis varies along said longitudinal axis.

3. The lift-up sun roof of claim 2 wherein said control ramp has a cross-sectional area varying along said longitudinal axis which determines said angle of gradient of said surface facing said lever.

4. The lift-up sun roof of claim 1 wherein a fulcrum of said pivotable lever is guided by said ramp in such a manner that said lever is subject to the action of the said control ramp on either side of its fulcrum.

5. The lift-up sun roof of claim 4 wherein an end of said lever distant from the fulcrum has a spherical configuration and is supported in a guide slidably at least in a transverse direction with respect to said longitudinal axis.

6. The lift-up sun roof of claim 1 wherein said lever is composed of two parts which are linked to be axially slidable relative to each other.

* * * * *